(No Model.)
M. MACLEOD.
RIDING SADDLE.
No. 321,830. Patented July 7, 1885.
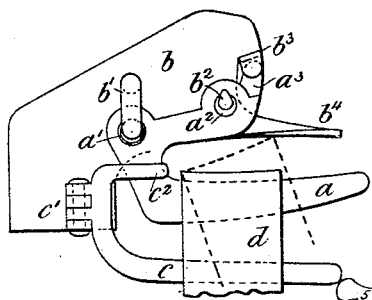
Fig. 1.
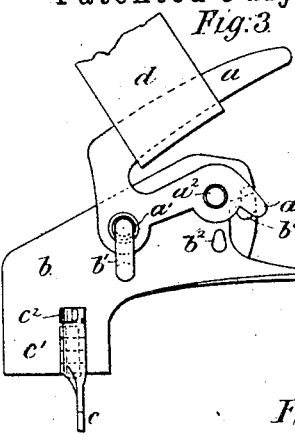
Fig. 3.
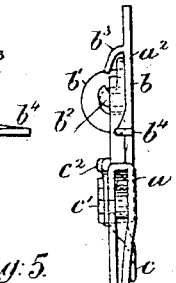
Fig. 2.
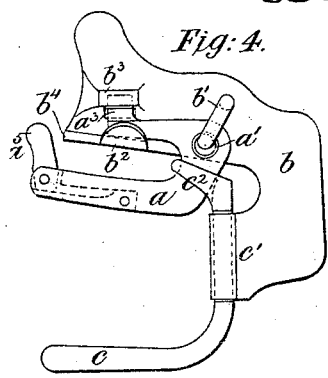
Fig. 4.
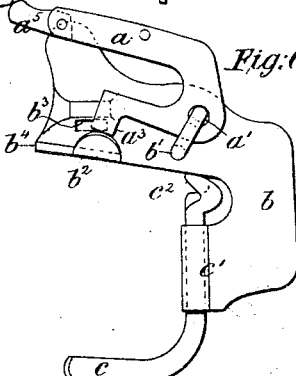
Fig. 6.
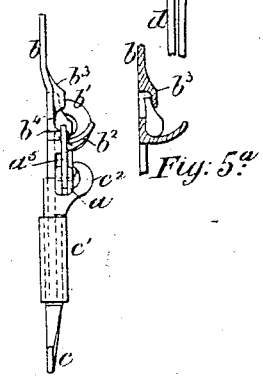
Fig. 5. Fig. 5.ᵃ
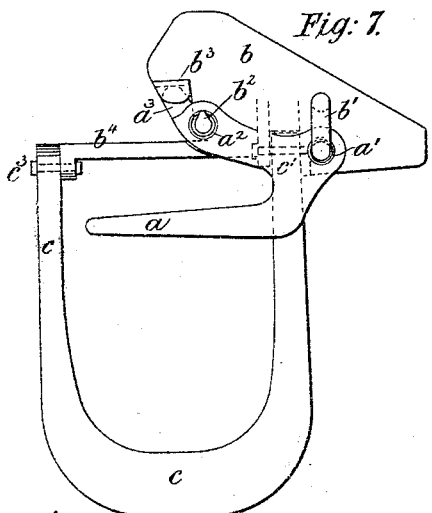
Fig. 7.
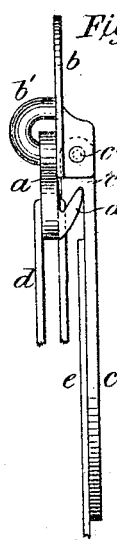
Fig. 8.
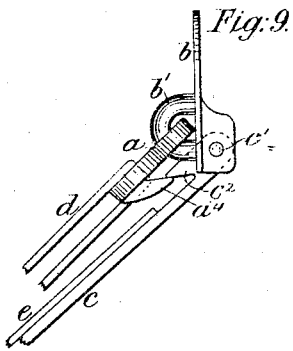
Fig. 9.
Witnesses:
Geo. L. Wheelock
Victor A. Lewis
Inventor,
Malcolm Macleod,
By Knight Bros
Attys.

UNITED STATES PATENT OFFICE.

MALCOLM MACLEOD, OF WEST HILL, MALMESBURY, COUNTY OF WILTS, ENGLAND.

RIDING-SADDLE.

SPECIFICATION forming part of Letters Patent No. 321,830, dated July 7, 1885.

Application filed February 25, 1885. (No model.) Patented in England February 15, 1883, No. 846.

*To all whom it may concern:*

Be it known that I, MALCOLM MACLEOD, a subject of the Queen of Great Britain, residing at West Hill, Malmesbury, in the county of Wilts, England, gentleman, have invented certain new and useful Improvements in Saddle-Bars, (for which I have received Letters Patent in Great Britain No. 846, dated February 15, 1883,) of which the following is a specification.
My invention consists in adapting the ordinary form of saddle-bar to turn in any direction outward, upward, and forward with the pull or strain exerted upon the stirrup-leather by the displacement or dislodgment of a rider or from other cause, so that the leather may be released either upward over the horse or forward or backward from engagement with the bar in a manner corresponding to that in which it has hitherto been released by a backward pull or strain only. The bar at its front end is secured to the saddle-tree or to a plate affixed to the saddle-tree by means of a double hinge or other form of flexible joint, instead of being riveted, as usual, and at the rear end the bar is supported and held against downward movement by a hook attached to the saddle-tree or to the plate affixed thereto, from which hook it is disengaged when the bar is turned upward. The bar is then free to turn on its hinge, and thus the stirrup-leather is readily released in any direction; and in order that the said invention may be more clearly understood and readily carried into effect, I will proceed, aided by the accompanying drawings, more fully to describe the same.

In the drawings, Figure 1 is a side view of a saddle-bar and adjacent parts constructed according to my invention, showing them in their normal position. Fig. 2 is a rear end view thereof; and Fig. 3 is a similar view to Fig. 1, but showing the bar turned up and in the act of releasing the stirrup-leather. Fig. 4 is a side view, and Fig. 5 is a rear end view, of a modification of my invention; and Fig. 5ª is a section of part of Fig. 5, showing the bar engaged by the catch; and Fig. 6 is a similar view to Fig. 4, but showing the parts in the position they would assume when releasing the stirrup-leather. Fig. 7 is a side view, and Fig. 8 is a front end view, of a further modification; and Fig. 9 is a similar view to Fig. 8, but showing the parts in action.

$a$ is the saddle-bar, which is connected at its front end to the plate $b$ by means of a hinge, preferably in the form of a staple, $b'$, passing through a hole, $a'$, in the bar $a$, such hole $a'$ being rounded at its edges to correspond with the form of the staple $b'$. At its rear end the bar $a$ is held suspended by the hook $b^2$, passing under the upper limb of the bar or into a hole, $a^2$, formed in the upper limb thereof. Lateral play, due to the nature of the hinge, is obviated by the tongue or projection $a^3$, formed on the upper limb of the bar and normally taking under a catch, $b^3$, formed on the plate $b$. An arm, $b^4$, formed on or fixed to the plate $b$ or to the saddle-tree, and extending backward therefrom, prevents the stirrup-leather from leaving the bar $a$ backward more readily than is requisite.

In order to prevent the bar turning upward except at the required times, a lever, $c$, is employed, which extends backward beneath the stirrup-leather $d$, or beneath the saddle-flap $e$, under the stirrup leather $d$, where it normally lies, as hereinafter described.

In the arrangement shown at Figs. 1, 2, and 3 the lever $c$ may be hinged at $c'$ to the plate $b$ or to the saddle-tree. Above the hinge $c'$ is a projection or pawl, $c^2$, formed on or carried by one end of the lever $c$, which is prolonged upward for that purpose. The projection or pawl $c^2$ tends to keep the bar $a$ in its normal position, and in this it is assisted by the rider. The arm $b^4$, extending backward from the plate $b$, prevents the stirrup-leather $d$ from leaving the bar $a$ backward too readily. As the leather tilts up on being pulled backward, as shown by the dotted lines in Fig. 1, friction is produced between it, the arm $b^4$, and the lower limb of the bar.

When an undue upward pull is exerted on the stirrup-leather $d$, the bar $a$ rises on the hinge $b'$, and hook $b^2$ turns the lever $c$ outward and forward, and the bar $a$ thus becomes clear of the projection or pawl $c^2$, the tongue or projection $a^3$ is withdrawn from the catch $b^3$, the rear end of the bar $a$ leaves the hook $b^2$, and the bar $a$ is then free to turn in any direction on the hinge $b'$ and allow of the stirrup-leather $d$ being withdrawn therefrom in the direction of the strain.

The modification shown at Figs. 4, 5, 5ª, and 6 is similar to the arrangement shown at Figs. 1, 2, and 3, except that the upper limb of the bar $a$, instead of being formed with a hole, $a^2$, to take onto the hook $b^2$, is formed solid, and in its normal position simply rests upon such hook, and the lower limb of the bar is provided or not with the usual thumb-piece, $a^5$.

In the modification shown at Figs. 7, 8, and 9 the lever $c$ is pivoted at its front end, $c'$, at the back of the plate $b$ at a point below the center of the staple $b'$, and is suspended at the opposite end by the hinge $c^3$, from the arm $b^4$, extending backward from the plate $b$, and depends vertically below the saddle-flap $e$. When the saddle-bar $a$ is in its normal position, the hook $a^4$, formed on the back thereof, is engaged with a hook or pawl, $c^2$, on the lever $c$, as seen more clearly in the end view, Fig. 8. As the bar $a$ is pulled upward by a strain on the stirrup-leather $d$, the saddle-flap $e$ has to be lifted by the lever $c$ before the hooks $a^4$ $c^2$, turning on the different centers, become disengaged and free the bar $a$ to turn in the required direction. Fig. 9 represents a position of the bar and the hooks as the lever is being raised.

If desired, the thumb-piece $a^5$ may be applied to any or all of the arrangements hereinbefore described and the form of the hinge $b'$ may be varied, so long as the same principle of action is retained, and the lever $c$ may be placed between or beneath the stirrup-leathers instead of beneath the saddle-flap $e$, and the parts carried by the plate $b$ may be attached directly to the saddle-tree, and, if desired, a spring or springs may be employed to retain the bar $a$ in its normal position, as will be readily understood.

Having now described the nature of my said invention and the mode in which the same may be carried into effect, I would have it understood that what I claim is—

1. The combination, with a saddle-tree side piece, of a saddle-bar hinged thereto at $b'$, and means for supporting the rear end of the saddle-bar, substantially as set forth.

2. A saddle-bar, $a$, hinged at $b'$, and normally held in position by a hook, $b^2$, and catch $b^3$, substantially as herein shown and described, and for the purpose stated.

3. A saddle-bar, $a$, hinged at $b'$, and normally held in position by a hook, $b^2$, and catch $b^3$, and controlled by a hinged lever, in manner substantially as herein shown and described, and for the purpose stated.

4. A saddle-bar hinged at $b'$, means by which the bar is normally held in position, and a hinged lever by which the bar is controlled, in manner substantially as herein shown and described, and for the purpose stated.

5. A saddle-tree side piece having a saddle-bar, $a$, hinged thereto, and a hinged lever, $c$, provided with a projection or pawl, $c^2$, substantially as herein shown and described, and for the purpose stated.

6. In combination with a saddle-bar, $a$, hinged at $b'$, and normally held in position by a hook, $b^2$, and catch $b^3$, an arm, $b^4$, acting in manner substantially as herein shown and described, and for the purpose stated.

7. In combination with a saddle-bar, $a$, hinged at $b'$, and normally held in position by a hook, $b^2$, and catch $b^3$, and controlled by a hinged lever, $c$, an arm, $b^4$, acting in manner substantially as herein shown and described, and for the purpose stated.

MALCOLM MACLEOD.

Witnesses:
C. M. WHITE,
C. K. MILLS,
  *Both of 23 Southampton Building, London.*